(12) United States Patent
Sheffield et al.

(10) Patent No.: US 9,250,832 B2
(45) Date of Patent: Feb. 2, 2016

(54) CONFIRMED DIVERT BITMAP TO SYNCHRONIZE RAID FIRMWARE OPERATIONS WITH FAST-PATH HARDWARE I/O PROCESSING

(71) Applicant: LSI CORPORATION, San Jose, CA (US)

(72) Inventors: Robert L. Sheffield, Longmont, CO (US); Gerald E. Smith, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 85 days.

(21) Appl. No.: 14/284,276

(22) Filed: May 21, 2014

(65) Prior Publication Data

US 2014/0359216 A1 Dec. 4, 2014

Related U.S. Application Data

(60) Provisional application No. 61/830,237, filed on Jun. 3, 2013.

(51) Int. Cl.
*G06F 3/06* (2006.01)

(52) U.S. Cl.
CPC ............ *G06F 3/0689* (2013.01); *G06F 3/0619* (2013.01); *G06F 3/0665* (2013.01)

(58) Field of Classification Search
CPC .... G06F 3/0689; G06F 3/0619; G06F 3/0665
USPC .......................... 711/114, 154, 156, 165, 221
See application file for complete search history.

(56) References Cited

U.S. PATENT DOCUMENTS

| | | | |
|---|---|---|---|
| 7,389,396 B1* | 6/2008 | Goel | G06F 11/0727 711/112 |
| 7,568,051 B1* | 7/2009 | Linstead | G06F 3/0617 709/226 |
| 8,213,294 B2* | 7/2012 | Arndt | H04L 41/0659 370/216 |
| 8,244,999 B1 | 8/2012 | Chatterjee et al. | |
| 8,321,635 B2 | 11/2012 | Ish | |
| 8,386,731 B2 | 2/2013 | Mashtizadeh et al. | |
| 8,880,802 B1* | 11/2014 | Krishnamurthy | G06F 12/00 711/114 |
| 8,990,527 B1* | 3/2015 | Linstead | G06F 3/0617 711/161 |
| 9,058,267 B2* | 6/2015 | Smith | G06F 12/08 |
| 2014/0164715 A1* | 6/2014 | Weiner | G06F 3/0613 711/143 |

* cited by examiner

*Primary Examiner* — Stephen Elmore

(57) ABSTRACT

A storage controller system is provided for the monitoring of fast path processing of I/Os to a storage device where the storage controller system allows for processing of I/Os to be monitored through the use of counters in a storage controller based upon the type of I/O issued to the storage controller as well as the conditions associated with the I/O, while providing a bitmap and associated divert bits and counters to monitor the processing of the I/Os in the storage controller. Methods for monitoring the processing of I/Os issued to the storage controller are also provided where the processing of the I/Os is based upon the type fast path I/Os issued to the storage controller and the conditions associated with the issued I/Os while providing a bitmap and associated divert bits and counters to monitor the processing of the I/Os in the storage controller, are also disclosed.

20 Claims, 3 Drawing Sheets

US 9,250,832 B2

CONFIRMED DIVERT BITMAP TO SYNCHRONIZE RAID FIRMWARE OPERATIONS WITH FAST-PATH HARDWARE I/O PROCESSING

CROSS REFERENCE TO RELATED APPLICATIONS

This application is a non-provisional patent application of and claims the benefit of U.S. Provisional Application No. 61/830,237, filed Jun. 3, 2013, the entire contents of which are incorporated herein by reference for all purposes.

FIELD

The present disclosure relates generally to computer systems and more particularly to storage systems.

BACKGROUND

All or most of the components of a computer or other electronic system may be integrated into a single integrated circuit (chip). The chip may contain various combinations of digital, analog, mixed-signal, and radio-frequency functions. These integrated circuits may be referred to as a system-on-a-chip (SoC or SOC). A typical application is in the area of embedded systems. A variant of a system on a chip is the integration of many RAID functions on a single chip. This may be referred to as RAID on a chip (ROC).

RAID arrays may be configured in ways that provide redundancy and error recovery without any loss of data. RAID arrays may also be configured to increase read and write performance by allowing data to be read or written simultaneously to multiple disk drives. RAID arrays may also be configured to allow "hot-swapping" which allows a failed disk to be replaced without interrupting the storage services of the array. The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY

An embodiment of the present invention may comprise a method for monitoring the processing one or more I/Os in a storage controller comprising: initiating a condition that requires synchronization of RAID operations of the storage controller with one or more affected I/Os; asserting a divert bit of the storage controller corresponding to an affected virtual drive address range; issuing and transmitting one or more I/Os from a driver to the storage controller; fast tracking the one or more I/Os from the storage controller to completion based on the absence of a collision with the asserted divert bit; diverting the one or more I/Os to firmware where the one or more I/Os have a condition that collides with the asserted bit; maintaining a count of the number of outstanding I/Os mapped to the asserted divert bit; and issuing a completion confirmation message to the firmware when counter reaches zero.

An embodiment of the present invention may further comprise a storage control system comprising: a storage controller coupled to a host system to receive storage I/O requests; the storage controller configured to assert a divert bit when initiating a condition that requires synchronization of RAID operations of the storage controller with one or more affected the I/Os; the storage controller configured to divert to firmware the I/Os with a condition that collides with the asserted bit; and wherein I/Os with a condition that does not collide with an asserted divert bit are transmitted to a storage device; and the storage controller comprises a counter configured to maintain a count of outstanding completion of the I/O requests from the host mapped to the asserted divert bit.

DETAILED DESCRIPTION OF THE EMBODIMENTS

Figure 1:
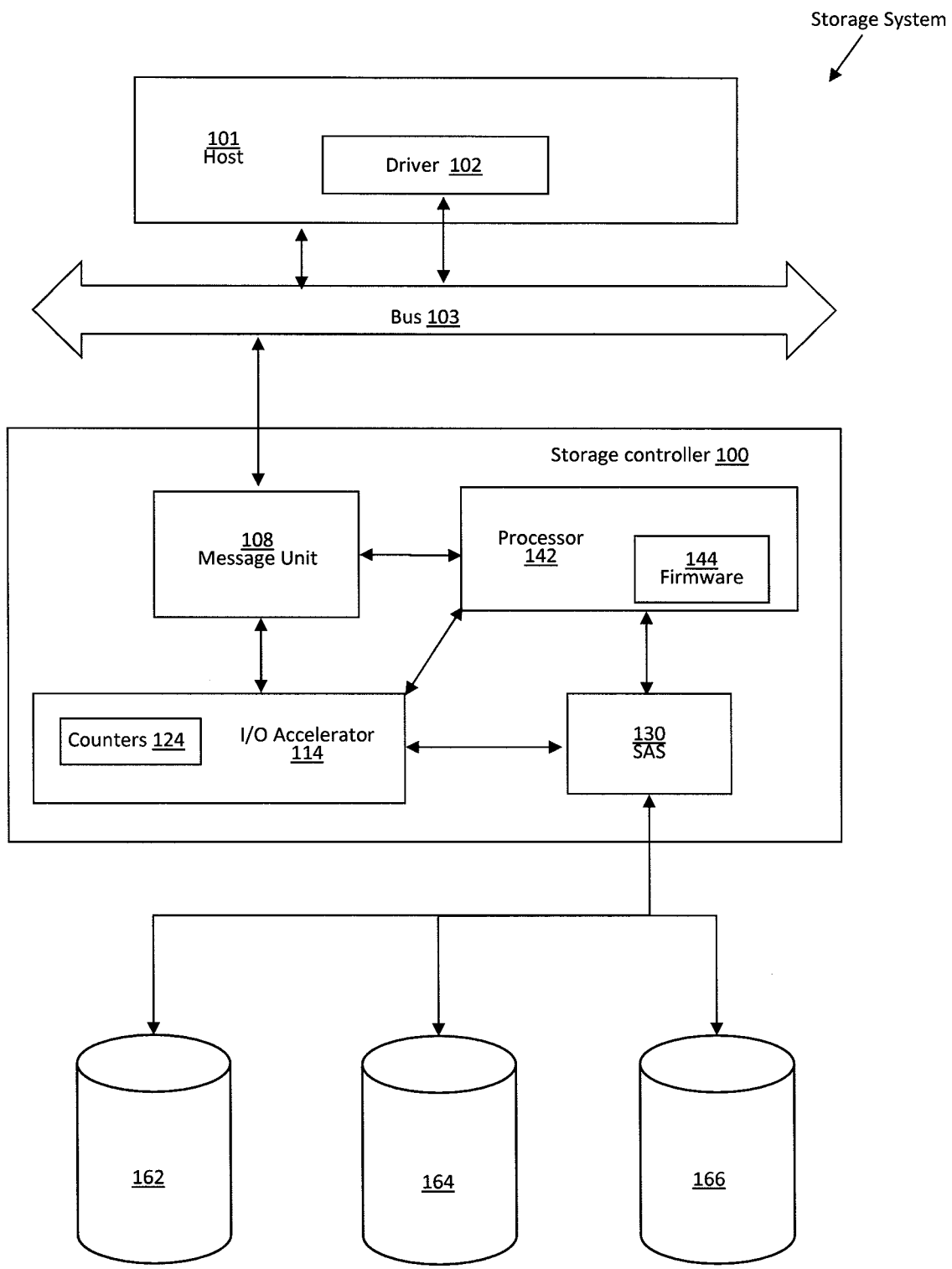
FIG. 1 is a block diagram illustrating a storage system.

FIG. 1 is a block diagram illustrating a storage system. In FIG. 1, the storage system comprises a host processor 101, a bus 103, a storage controller 100, and storage devices 162, 164, and 166. The host processor 101 includes a driver 102. The storage controller 100 includes a message unit 108, processor 142, I/O accelerator 114, and serial attached SCSI (SAS) interface 130. The I/O accelerator 114 includes at least one counter 124. The processor 142 includes firmware 144.

Host processor 101 is operatively coupled to the bus 103. Bus 103 may be, for example, a PCIe bus. The bus 103 is operatively coupled to the storage controller 100. The storage controller 100 may be, or include, a RAID controller. The message unit 108 is operatively coupled to the processor 142 and I/O accelerator 114. The I/O accelerator 114 is operatively coupled to the message unit 108, the SAS interface 130 and processor 142. The Processor 142 is operatively coupled to the message unit 108, the I/O accelerator 114 and the SAS interface 130. The SAS interface 130 is operatively coupled to the processor 142, the I/O accelerator 114 and storage devices 162, 164, and 166. Storage devices 162, 164, and 166 may be, for example, physical disk drives, solid-state disk drives, or a combination thereof.

The driver 102 of the host 101 issues or transmits to the storage controller 100 message unit 108 input/output signals (I/Os) through the bus 103. The message unit 108 processes the I/Os from the driver 102 and then as will be discussed in more detail later, transmits the I/Os to the processor 142 or the I/O accelerator 114.

As will be discussed further detail in FIG. 2, the I/O accelerator 114, is used to synchronize firmware-originated RAID operations with the issued I/Os, where conditions associated with the I/Os 110 may be affected by the RAID operations. When firmware 144 initiates a condition that requires synchronization with the I/Os, the firmware 144 will assert divert bits within the I/O accelerator 114 corresponding to the affected virtual drive address ranges. Counters 124 located in the I/O accelerator 114 corresponding to the conditions associated with each asserted divert bit maintain the number of outstanding I/O completions corresponding to the asserted divert bit in a divert bitmap. Each counter 124 maintains a running count of the issued I/Os, incrementing the appropriate counter 124 by one for each newly initiated I/O, and decrementing the appropriate counter 124 by one for each I/O completion to storage devices 162, 164, and 166. By maintaining a count of the issued I/Os, firmware 144 is able to maintain a count of the number of outstanding I/O completions that are still pending completion. The I/O accelerator 114 will issue a message to the firmware 144 whenever the corresponding counter 124 is decremented to zero, or if firmware 144 asserts a divert bit for a counter 124 that is already zero. After firmware 144 completes processing of the condition that required diversion of I/Os, firmware 144 clears the corresponding asserted divert bit in the divert bitmap. For I/Os completed directly to firmware 144 (such as due to a SAS 130 protocol error), the I/O accelerator 114 must support the capability for firmware 144 to decrement any counter 124 as though the completion had been received through the fast-path completion path. Firmware 144 may determine when there are no longer any outstanding I/O completions by reading the state of the associated counter 124, or by recognizing the message issued to firmware 144 by the I/O accelerator 114. When devices complete I/Os to storage 162, 164, or 166 (successfully), the devices return (successful) completion status to the I/O accelerator 114, and the I/O accelerator 114 routes the completion status to either the message unit 108 or to firmware 144, depending on the origin of the I/O in the first place (or a firmware 144 override to return completion status to the host 101 for I/O originated by the firmware).

Figure 2:
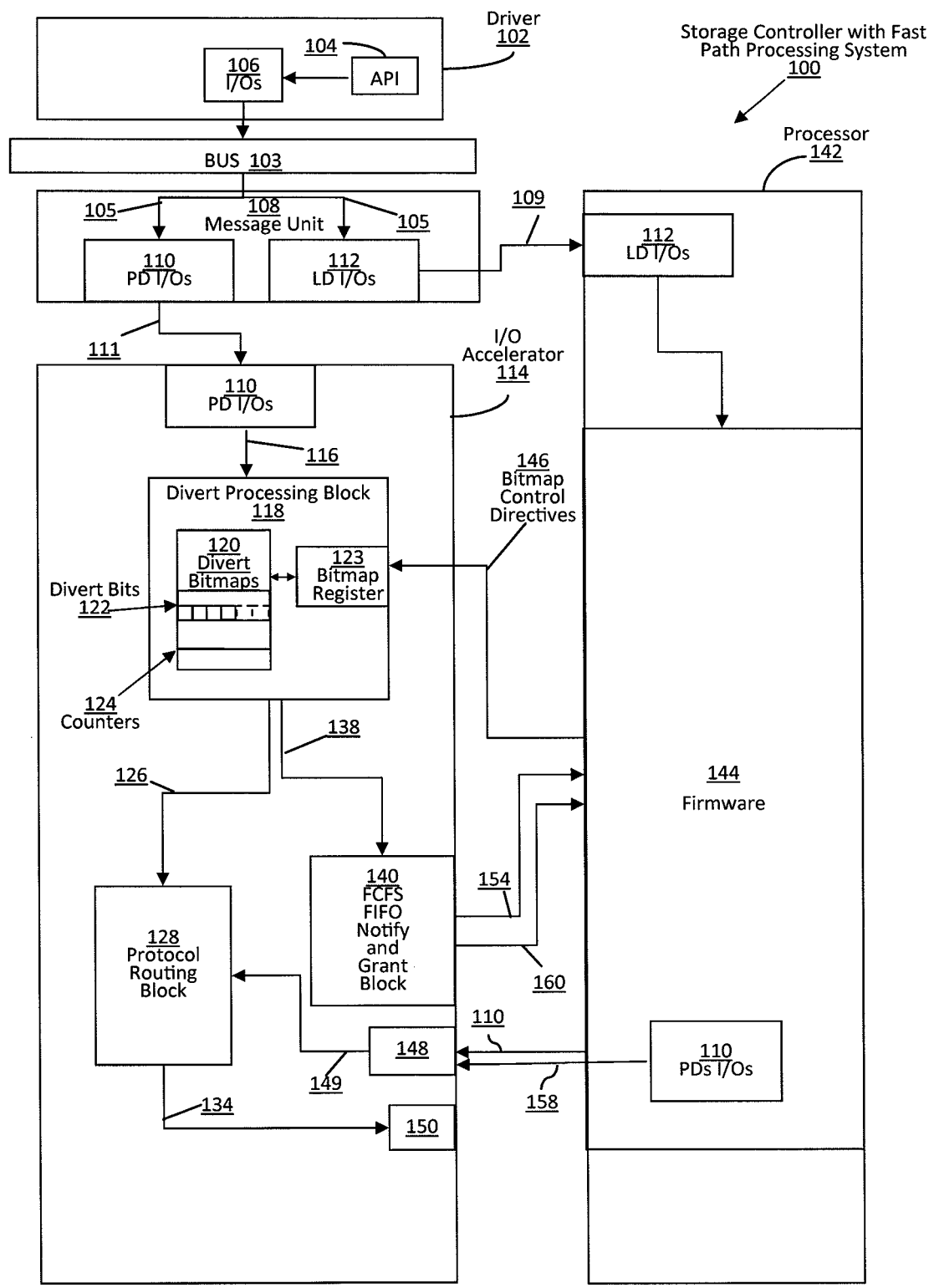
FIG. 2 is a block diagram illustrating a storage controller with a fast path processing system.

FIG. 2 is a block diagram illustrating in more detail the storage controller 100 of FIG. 1 with a fast-path I/O processing system using a confirmed divert bitmap. As shown in FIG. 2, a driver 102 and host memory is operably coupled by means of a bus or PCIe interconnect 103 to the fast-path I/O processing system of a storage controller 100, such as a RAID controller. The storage controller 100 comprises a message unit 108, an I/O accelerator 114 and a processor 142, which includes the storage controller's firmware 144. The message unit 108 is operably coupled to the I/O accelerator 114 as well as the processor 142. The I/O accelerator 114 includes a divert processing block 118 comprising a bitmap control register 123 and bitmaps such as divert bitmaps 120 (Abridged Unconfirmed LBA-mapped Bitmap, Large Unconfirmed LBA-mapped Bitmap, Confirmed LBA-mapped Bitmap, Confirmed LD-ID-mapped Bitmap and a Global Divert Bit), which includes divert bits 122 and pending completion counters 124. The I/O accelerator 114 also includes a protocol routing block 128, a FCFS FIFO Notify and Grant Block interface 140, at least one receiving interface block 148 and a completion interface block 150 which sends PD I/Os to storage devices (not shown in FIG. 2). The Protocol Routing Block 128 issues PD I/Os 110 received, either from the message unit 108 or from firmware 144, to the attached devices (not shown in FIG. 2). When the attached devices (such as the storage devices 162, 164, and 166 described in FIG. 1) complete PD I/Os 110 successfully, the devices return a successful completion status to the I/O accelerator 114. The I/O accelerator 114 routes the completion status of the PD I/Os 110 to either the message unit 108 or to firmware 144 by means of the completion interface block 150, depending on the origin of the PD I/O 110.

The processor 142, includes firmware 144 that is run by the processor 142. The processor 142 may comprise a microprocessor, microcontroller, logic circuit or other processing device and may be distributed among several processing devices. Please note that the divert bitmaps 120 are shared by and operably coupled between the I/O accelerator 114 and the processor 142 firmware 144. While in this example the divert bitmaps 120 and associated bitmap control register 123 and pending completion counters 124 are located in the I/O accelerator 114, as would be obvious to one skilled in the art, the bitmaps 120, register 123 and pending completion counters 124 may also be implemented in the driver 102 of the storage system.

As shown in FIG. 2, the driver 102, issues or transmits 105 to the message unit 108 input/output signals (I/Os) 106, including LD I/Os (issued to logical drives) 112 and PD I/Os (issued to physical drives) 110. The driver 102 includes an application programming interface ("API") 104 which provides the communication between the host application/OS and the driver 102.

The issued I/Os 106 are managed by the message unit 108. The message unit 108 is operably coupled to both the I/O accelerator (IOA) 114 and the I/O processor 142. The message unit 108 processes the LD I/Os 112 and PD I/Os 110 from the host driver 102 and then transmits 109 the LD I/Os 112 to the I/O processor 142 while the PD I/Os 110 are transmitted 111 to the I/O accelerator 114.

In the I/O accelerator 114 of the storage controller 100, the divert processing block 118, which contains the divert bitmaps 120 and bitmap control register 123, is operably coupled to the protocol routing block 128 and the FCFS FIFO Notify and Grant Block 140. The divert bitmaps 120, comprising divert bits 122 with the corresponding I/O pending completion counters 124, and bitmap control register 123 are used to synchronize firmware-originated RAID operations with fast-path PD I/Os 110, where conditions associated with the PD I/Os 110 may be affected by the RAID operations. As will be discussed in further detail, the number of divert bits 122 in the divert bitmaps 120 relates to the number of conditions of the PD I/Os requiring synchronization at any given time. When firmware 144 initiates a condition that requires synchronization with fast path I/Os 110, the firmware 144 will assert divert bits 122 corresponding to the affected virtual drive address ranges. Please note that as used herein, the term "conditions" may include but is not limited to dirty cached data, firmware-maintained records of invalid data-blocks, stripe-level recovery operations, configuration changes or selected internal background operations.

In an embodiment, the message unit 108 will transmit 116 fast path PD I/Os 110 to the divert processing block 118 where the divert processing block 118 will identify any potential conditions associated with the PD I/Os 110 that may require processing by the processor 142 firmware 144 by hashing the LD-ID and Logical LBA specified in the I/O to a bit number, and checking to determine if the corresponding bit is asserted. For PD I/Os 110 received from the message unit 108 that do not need to be diverted to the processor 142 firmware 144 (based on the conditions associated with the PD I/Os 110 and the absence of a collision with asserted bits 122 in the divert bitmap 120) the divert processing block 118 routes 126 the PD I/Os 110 directly to the protocol routing block 128. From the protocol routing block 128, the PD I/Os 110 are routed to a storage device such as a disk, tape, or SSD.

In an embodiment, for PD I/Os 110 transmitted 111 from the message unit 108 to the divert processing block 118 that do require synchronization based on the conditions associated with the issued PD I/Os 110, the divert processing block 118 routes 138 and 154 the PD I/Os 110 to the processor 142 through the FCFS FIFO Notify and Grant Block 140 for processing by the processor's 142 firmware 144.

Table 1 below shows an example description of a 32 bit (0-31) Bitmap Control Register 123 and the directives issued to the Divert Processing Block 118 through the Bitmap Control Register 123. As shown in Table 1, an example of the general format of the control word specifying an operation performed on divert bitmap 120 is provided, where divert bits 29-31 are associated with the operation code (Opcode), and bits 0-28 are dependent upon the Opcode directive; which include reserved, set divert bit, clear divert bit, increment a counter in the specified bitmap, decrement a counter in the specified bitmap, and set a counter in the specified bitmap to zero.

TABLE 1

Divert bitmap directive format

| 31 29 | 28 24 | 23 16 | 15 8 | 7 0 |
|---|---|---|---|---|
| Opcode | | Opcode dependent (set bit, clear bit, or perform counter operation) | | |

Table 2 provides an example of the codes (0-7) associated with each Opcode directive for bitmap operations identified in Table 1.

TABLE 2

Decode of the bitmap operations

| Opcode | Divert Bitmap/Counter operation |
|---|---|
| 0 | Reserved |
| 1 | Set Divert bit |
| 2 | Clear Divert Bit |
| 3 | Increment a counter in the specified bitmap |
| 4 | Decrement a counter in the specified bitmap |
| 5 | Set a counter in the specified bitmap to zero |
| 6-7 | Reserved |

Table 3 provides an example of the general format of the control word of the bitmap control register 123 specifying a divert bitmap 120 set directives, Opcode directive 1 as identified in Table 2.

TABLE 3

Divert bitmap set directive

| 31 29 | 28 | | | | 24 23 | 16 15 | 8 7 | 0 |
|---|---|---|---|---|---|---|---|---|
| Opcode | 4 | 3 | 2 | 1 | 0 | | | |
| 1 = set | Bitmap IDs | | | | | | Bit Number | |

Table 4 provides an example of the general format of the control word of the bitmap control register 123 specifying a divert bitmap 120 clear directive, Opcode directive 2 as identified in Table 2.

TABLE 4

Divert bitmap clear directive

| 31 29 | 28 | | | | 24 23 | 16 15 | 8 7 | 0 |
|---|---|---|---|---|---|---|---|---|
| Opcode | 4 | 3 | 2 | 1 | 0 | | | |
| 2 = clr | Bitmap IDs | | | | | | Bit Number | |

The function of an asserted divert bit 122 is to divert a received fast-path PD I/O 110 away from the fast-path hardware to firmware 144, in the case where the hashed LD-ID and LD-LBA map to the specified bit, so that firmware 144 can manage the synchronization of the PD I/O 110 with active firmware-originated RAID operations that affect the processing of that PD I/O 110.

The I/O accelerator 114 maintains an internal RAM that contains the hash-indexed divert bitmaps 120 which may contain a comparatively large number (for example in the range from one million to sixteen million) bits for the unconfirmed bitmap with no counters used for dirty RAID cache. For the confirmed bitmap 120 as described above, a much smaller bitmap (4096 bits for example) is used to track the temporary conditions of the PD I/Os in firmware 144 that affect fast-path I/O processing.

Divert bits 122 of the divert bitmaps 120 are operably coupled to and set (asserted) 146 by firmware 144 based on conditions associated with processing received I/Os 110 (either LD I/Os or fast-path PD I/Os which are diverted away 154 from the fast-path hardware to firmware 144), or cleared (deasserted) 146 by the processor 142 firmware 144 once the firmware 144 completes processing of the condition that required diversion of fast-path I/Os 110. The divert bits 122 are also operably coupled to and consulted by the divert processing block 118 of the I/O accelerator 114 while the I/O accelerator 114 processes PD I/Os 110 to determine when I/Os must be diverted 154 to the processor's 142 firmware 144 for processing.

Firmware 144 may specify that multiple bitmaps in the divert bitmap 120 are to set or clear a specified bit 122 by the request written to the register 123 by asserting multiple bits in a bitmap IDs field, as described below. The I/O accelerator 114 will ignore high-order bits in the specified bit number so that the remaining bits specify a bit number available in the specified bitmap. For example, if the hash chunk size is 2,048 blocks (1 MB for a 512-byte block size) for both the 4,096-bit confirmed LBA-mapped divert bitmap and the 2-Mib large unconfirmed LBA-mapped divert bitmap, and the firmware 144 issues a request 146 to the "set" register specifying a value of 0xDF4B3C as the bit number, then the I/O accelerator 114 will use the value 0xB3C as the bit number for the 4,096-bit bitmap (12 bits of relevant index), and will use a value of 0x1F4B3C as the bit number for the 2-Mib bitmap.

Table 5 provides an example of the bitmap ID bits associated with each specified bitmap of the divert bitmap 120.

TABLE 5

Mapping of Bitmap IDs

| Bitmap IDs Bits[1] | Bitmap specified |
|---|---|
| 0 | 2 Mib (nominal) Abridged Unconfirmed LBA-mapped Bitmap |
| 1 | 16 Mib (nominal) Large Unconfirmed LBA-mapped Bitmap |

TABLE 5-continued

Mapping of Bitmap IDs

| Bitmap IDs Bits[1] | Bitmap specified |
|---|---|
| 2 | 4,096 bit (nominal) Confirmed LBA-mapped Bitmap |
| 3 | (512-bit) Confirmed LD-ID-mapped Bitmap |
| 4 | The Confirmed Global (all I/Os for all LDs) Divert Bit |

[1]A value of zero is processed as a no-op and has no effect on divert bits

A bit number of an asserted bit 122 represents a hash slot that maps to one or more conditions that require firmware 144 processing for overlapping PD I/Os 110. As discussed above, the conditions that require firmware 144 processing of overlapping PD I/Os 110 include dirty write buffers, valid RAID cache lines, bad-block entries maintained by firmware, and temporary conditions requiring isolation of one or more stripes, a specified LD ID, or the entire controller 100, to maintain coherency of data and parity on media. The I/O accelerator 114 determines the disposition of a fast-path PD I/O 110 by examining the bitmaps to determine if a fast-path PD I/O 110 might collide with a flagged condition, indicated by one (or at most 2) asserted bits 122 in any of the enabled bitmaps, and should therefore be redirected to firmware 144.

Bitmaps 120 are read-only by the I/O accelerator 114, and firmware 144 is responsible to set and clear 146 the bits as conditions that require diversion of fast-path PD I/Os 110 are established and retired.

The divert bitmap 120 maintains separate 16-bit counters 124 corresponding to the conditions associated with each asserted divert bit 122 in the confirmed bitmaps, and constantly maintain the number of outstanding PD I/O 110 completions that overlap the hash-bucket corresponding to the divert bit 122. Each counter 124 maintains a running count of the fast-path PD I/Os 110 that are transmitted from the divert processing block 118 to the protocol routing block 128, incrementing the appropriate counter 124 by one for each newly initiated PD I/O 110, and decrementing the appropriate counter 124 by one for each PD I/O 110 completion that is returned to the protocol routing block 118. The divert bitmap 120 will maintain a count of the number of outstanding PD I/O 110 completions that are mapped to the corresponding divert bit 122 and are still pending completion (independent of whether the divert bit 122 has been set or cleared 146 by firmware 144 at any given point in time). The divert bitmap 120 issues a Notify message 160 through the FCFS FIFO Notify and Grant Block 140 to the firmware 144 whenever the corresponding counter 124 for an asserted bit 122 is decremented to zero, or if firmware 144 asserts a divert bit 122 for a counter 124 that is already zero. After firmware 144 completes processing of the condition that required diversion of fast-path PD I/Os 110, firmware 144 clears 146 the corresponding bit 122 in the divert bitmap 120. For PD I/Os 110 completed directly to firmware 144 (such as due to a SAS protocol error), the I/O accelerator 114 must support the capability for firmware 144 to decrement any counter 124 as though the completion had been received through the fast-path completion path. Firmware 144 may determine when there are no longer any outstanding fast-path PD I/O 110 completions associated with a set divert bit 122 by reading the state of the associated counter 124, or by recognizing the Notify message 160 issued to firmware 144 by the FCFS FIFO Notify and Grant Block 140. The memory required to hold the counters and divert bits for a 4,096-bit confirmed divert bitmap is 4 KB×2 for the counters 124, and 4KB/8 for the confirmed divert bits 122, for a total of 8.5KB.

As shown in Table 6, the I/O accelerator 114 provides a bitmap counter update control word for this purpose. Table 6 defines the bitmap counter update control word where bits 29-31 are associated with the Opcode, bits 24-28 are associated with a divert bitmap as identified in Table 5 and bits 0-23 are associated with a counter number.

TABLE 6

Bitmap Counter Update FIFO element

| 31 29 | 28 24 | 23 16 15 8 7 0 |
|---|---|---|
| Opcode | Bitmap | counter number |

An example of the Opcode of the bitmap counter update first in, first out element may be as follows:
  3: Increment the specified counter number in the specified bitmap 120 by one.
  4: Decrement the specified counter number in the specified bitmap 120 by one. Decrementing the counter to zero may cause the IOA 114 to issue a notification 160 to firmware
  5: Set the specified counter number in the specified bitmap 120 to zero. Setting the counter to zero may cause the IOA 114 to issue a notification to firmware 144.
  6-7: Reserved
An example of the Opcode of the bitmap may be as follows:
  0x0-0x2: Reserved
  0x3: Perform the specified operation on the specified counter associated with the Confirmed LBA-mapped Divert Bitmap 120
  0x4: Perform the specified operation on the specified counter associated with the Confirmed LD-ID-mapped Divert Bitmap 120
  0x5: Perform the specified operation on the counter associated with the Global Divert Bit (the counter number is undefined and should be set to zero).
  0x6-0x1F: Reserved The counter number specifies the counter 124 to be operated on in the specified confirmed bitmap 120 (either the confirmed LBA-mapped divert bitmap or the confirmed LD-ID-mapped divert bitmap). The counter number is undefined when operating on the counter 124 associated with the global divert bit, and should be set to zero.

In addition to the bitmap counter update first in, first out element, the I/O accelerator 114 provides firmware 144 memory-mapped access to all counters 124 so that firmware 144 can read and write counters 124 directly.

While a given divert bit 122 is set, newly issued PD I/Os 110 received by the divert processing block 118 from the message unit 108 that collide with the asserted divert bit 122 (by virtue of the hash of the storage device logical block address (LBA) range accessed producing the index of a set divert bit 122) are redirected 138 and 154 from the divert processing block 118 to firmware 144 through the FCFS FIFO Notify and Grant Block 140. A given PD I/O 110 should never affect more than two divert bits 122 because the hash slot is designed to be at least as large as the largest PD I/O 110 that is supported. The I/O accelerator 114 will perform the same hash for any new fast-path PD I/Os 110 received from the message unit 102, and if the hashed result maps to an asserted divert bit 122, the PD I/O 110 is diverted to firmware 144 by posting a Grant message 160 to the FCFS FIFO Notify and Grant Block 140 with the Grant message 160 containing the bit ID of the bitmap that produced a collision.

Upon receiving a confirmation Notify signal or message 160 from the appropriate counter 124 through the FCFS FIFO Notify and Grant Block 140, that the counter 124 is zero, upon completion of the last outstanding FP I/O 110 mapping to that bit, the firmware 144 will then be free to execute the RAID operation that requires synchronization with the affected PD I/Os 110. The Notify message 160 provided the firmware 144 with a change in the state of the bit 122/counter 124 along with the identity the bit number affected. PD I/Os 110 diverted to firmware 144 while the divert bit 122 is asserted are either processed by firmware 144 in coordination with the RAID operation affected by the PD I/Os 110, or are pended by firmware 144 until the RAID operation is complete. The firmware 144 may then process the pended PD I/Os 110 or redirect the pended PD I/Os 110 back to the I/O accelerator 114 for processing. The I/O accelerator 114 will then forward the PD I/Os 110 to the protocol routing block 128 to be issued to attached storage devices. Also, if the reply destination associated with the PD I/O 110 is "Host", then the affected counter or counters 124 are incremented to reflect the presence of additional pending fast-path completions to be processed by the hardware. Once the RAID operations that required asserting a divert bit 122 are complete, the firmware 144 will deassert or clear 146 the divert bit 122, to allow the fast path to continue processing of PD I/Os 110 that map to that divert bit 122.

In an embodiment, the processor 142 firmware 144 may issue and route 158 firmware-originated PD I/Os 110 directly to the protocol routing block 128, bypassing the divert processing block 118 by means of the receiving block 148 that is operably coupled to the protocol routing block 128. Processor 142 firmware 144 will not issue PD I/O 110 requests directly to the protocol routing block 128 that have conditions that require the divert bitmap 120 of the divert processing bock 118 to route the I/Os to firmware 144.

In an embodiment, the driver may issue LD I/Os 112 (I/Os issued to virtual or logical devices). The LD I/Os 112 are transmitted 105 from the driver 102 to the message unit 108. LD I/Os 112 that may be received by the message unit 108 from the driver 102, are delivered by the message unit 108 to firmware 144 for processing by the firmware 144. Upon receiving the LD I/Os 112, firmware 144 will process the LD I/Os 112 to determine whether the specified operation might conflict with fast-path PD I/O operations occurring at the same time. If there is a potential conflict, firmware will instruct the divert processing block 118 to assert one or more divert bits 122 associated with the range of LBAs affected by the LD I/O 112.

Firmware 144 will perform RAID mapping operations on LD I/Os 112 that affect I/Os overlapping a specified LBA range. RAID operations by the firmware 144 to process LD I/Os 112 converts the LD I/Os to one or more PD I/Os 110 which are sent 158 to the receiving interface block 148 of the I/O accelerator 114 and routed 149 to the protocol routing block 128. From the protocol routing block 128 the processed PD I/Os 110 are routed 134 directly an attached storage device such as a disk or solid-state drive.

The divert bitmaps 120 described herein are designed to minimize the impact on PD I/Os 110 that do not collide or require synchronization with firmware-maintained elements based on LBA overlap detection. The ability of the divert bitmaps 120 to divert selected PD I/Os 110 to firmware 144 is based on the conditions associated with the logical drive address ranges affected by the PD I/Os 110. A scattering hash algorithm may be used to prevent excessive clustering of conditions onto selected divert bits 122 that are associated with modulo boundaries, and to scatter slot assignments for different LD I/Os. Each divert bit 122 of the divert bitmaps 120 represents ranges of addressable space on one or more storage devices, with the divert bit 122 number of the divert bitmaps 120 determined as a hash of the storage devices logical drive ID (LDID) and the LBA to be accessed by a given PD I/O 110 for PD I/O 110. In the hash map, a right-shift of the LBA is conducted so that each divert bit 122 represents a range of LBAs. Higher-order bits are masked off as well, which has the effect of mapping multiple LBA ranges to the same hash slot. In the end, the number of hash slots is $2^n$, where n is the number of bits left after shifting and masking. The average number of conditions mapped per divert bit 122 at any given time is substantially smaller than one. For example, if a storage controller has initiated I/Os with as many as 400 conditions active that need synchronization at any given time, then a divert bitmap 120 of 4000 divert bits 122 provides an average loading per divert bit 122 of 0.1. The light loading per bit 122 leaves ample clear bits 122 to allow most fast-path PD I/Os 110 to be processed directly in hardware without incurring firmware 144 processing overhead.

One use of the confirmed bitmaps 120 described herein is to allow firmware 144 to alter the location or contents of data on media that would potentially be accessed by an in-flight fast-path I/O, unbeknownst to firmware 144. Examples where this might occur include array rebuild for capacity expansion and redistribution of data in a D-RAID mapped volume. In such cases, prior to operating on an affected range of media, firmware 144 not only needs to prevent newly issued fast-path I/Os 110 in the range of the affected media from being issued to devices, but also needs to confirm that any previously issued fast path I/Os in the range of the affected media have completed.

Figure 3:
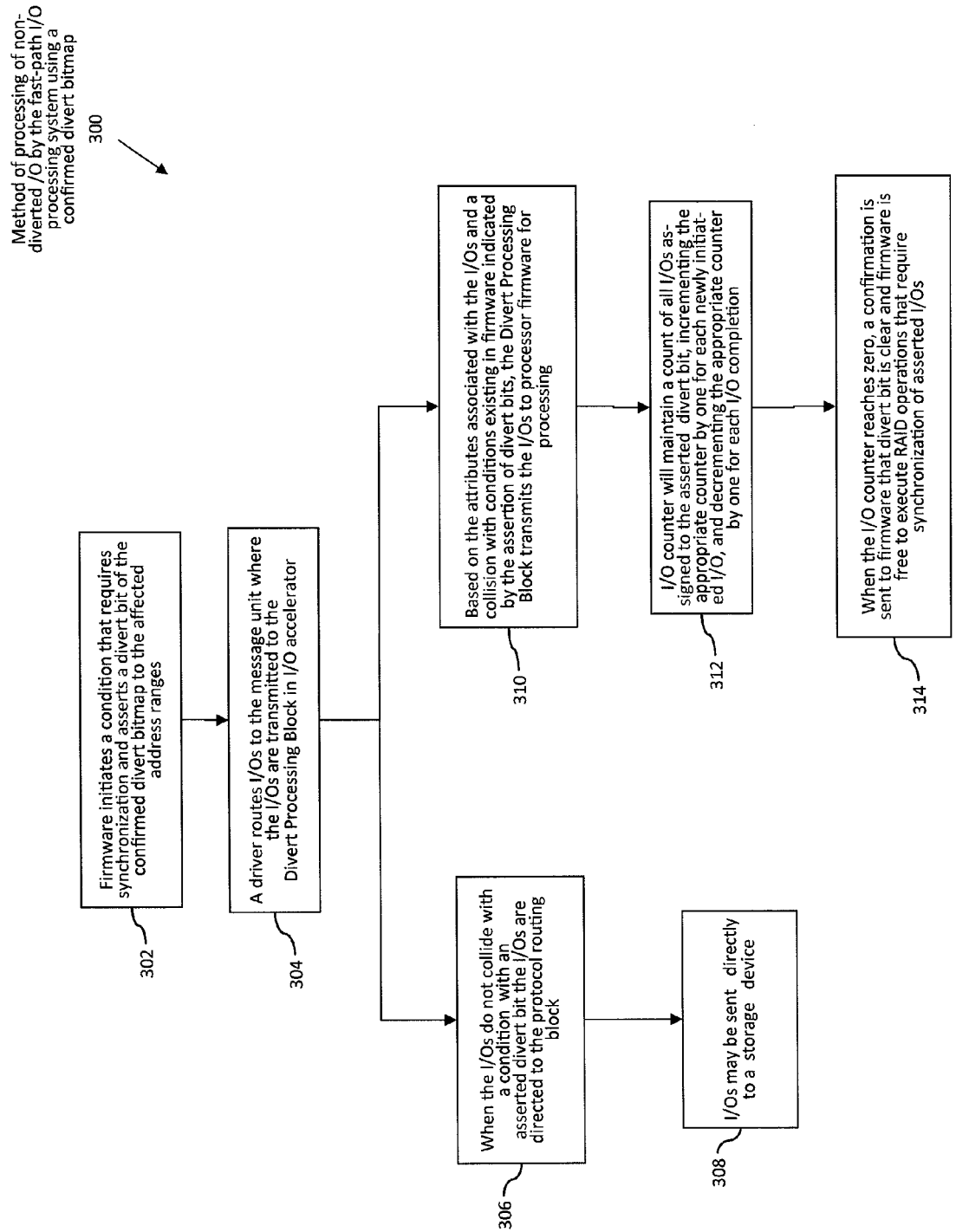
FIG. 3 is a flow diagram for a method of monitoring the processing of non-diverted I/Os and diverted I/Os to firmware based on the conditions associated with the I/Os.

In FIG. 3, a flow diagram is provided showing the processing and monitoring of I/Os by the fast-path I/O processing system using a confirmed divert bitmap 300. In step 302, firmware initiates a condition that requires synchronization with the I/Os. The firmware will assert divert bits of the divert processing block within the I/O accelerator corresponding to the affected virtual drive address ranges. In step 304, the driver will issue I/Os, such as PD I/Os from the host to the message unit of the storage system. The message unit will then transmit the I/Os to the I/O accelerator where the PD I/Os are processed in the divert processing block. In step 306, based on the conditions associated with the I/Os and the absence of a collision with asserted bits in the divert bitmap, the POs do not need to be diverted to processor firmware. Therefore, the I/Os are fast tracked from the divert processing block and routed to the protocol routing block. In step 308, from the protocol routing block, the I/Os are routed for completion directly to a storage device or routed to the driver. In step 310, for I/Os with a condition that creates a collision with assert divert bits that require the processing and synchronization by the processor's firmware, the I/Os are diverted to the processor firmware for processing. Because this is asynchronous with the processing of fast-path I/Os of steps 306 and 308, the divert processing block must confirm by counting the number of outstanding fast-path I/O completions associated with each asserted bit that any previously issued I/Os mapping to the affected divert bits have been completed and cleared from the fast-path processing. In step 312, counters located in the I/O accelerator corresponding to the conditions associated with each asserted divert bit maintain the number of outstanding I/O completions corresponding to the divert bit in divert bitmap. Each counter maintains a running count of the number of outstanding (uncompleted) fast-path I/Os mapping to that divert bit, incrementing the appropriate counter by one for each newly initiated I/O, and decrementing the appropriate counter by one for each I/O completion allowing the firmware to maintain a count of the number of outstanding I/O completions that are still pending completion. Counters are incremented for all colliding bits (whether the bits are asserted or not) when a fast-path I/O is sent to the protocol routing block. In step 314, when the pending I/O completion counter reaches zero, a confirmation Notify signal or message from the appropriate counter is sent to the firmware indicating that the fast-path pipeline is clear of fast-path I/Os mapping to the asserted divert bit. Upon receiving the I/O completion count zero confirmation from the divert bitmap, the firmware is free to execute the RAID operation that requires synchronization with the affected I/Os. I/Os diverted to firmware while the divert bit is asserted are either processed by firmware in coordination with the affected internal RAID operation, or are pended by firmware until the internal RAID operation is complete; at which point firmware may process the pended I/Os or redirect them back to the fast-path for processing. Firmware-originated I/Os may specify that (after the I/O is routed to and processed by a storage device) a successful completion is routed to the host or that a successful completion is to be routed back to firmware. If the I/O completion is to be routed back to firmware, then the counter(s) are unaffected, either when the I/O is submitted or when the completion is returned. If the I/O completion is to be routed back to the host, then the affected counter is incremented when the I/O is issued, and the affected counter is decremented when the completion is returned. Once the internal RAID operation that required asserting a divert bit is complete, the firmware deasserts the divert bit, restoring the hardware fast-path processing for POs that map to that bit.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for monitoring the processing of one or more I/Os in a storage controller comprising:
    initiating a condition that requires synchronization of RAID operations of said storage controller with one or more affected I/Os;
    asserting a divert bit of said storage controller corresponding to affected virtual drive address ranges;
    issuing and transmitting one or more I/Os from a driver to said storage controller;
    fast tracking said one or more I/Os from said storage controller to completion based on the absence of a collision with said asserted bit;
    diverting said one or more I/Os to firmware wherein said one or more I/Os have a condition that collides with said asserted bit;
    maintaining a count of the number of outstanding I/Os mapped to said asserted bit; and
    issuing a completion confirmation message to firmware when said counter reaches zero.

2. The method of claim 1, wherein upon receipt of a completion message, firmware synchronizes RAID operations of said storage controller.

3. The method of claim 1, further comprising:
    incrementing the appropriate counter by one for each newly initiated I/O.

4. The method of claim 1, further comprising:
    decrementing the appropriate counter by one for each I/O completion.

5. The method of claim 1, further comprising:
    diverting I/Os for processing by firmware in coordination with said affected RAID operation.

6. The method of claim 1, further comprising:
    pending diverted I/Os by firmware until the internal RAID operation is complete.

7. A storage control system comprising:
    a storage controller coupled to a host system to receive storage I/O requests;
    the storage controller configured to assert a divert bit when initiating a condition that requires synchronization of RAID operations of said storage controller with one or more affected said I/Os;
    the storage controller configured to divert to firmware said I/Os with a condition that collides with said asserted bit;
        wherein I/Os with a condition that does not collide with an asserted divert bit are transmitted to a storage device; and
    the storage controller comprises a counter configured to maintain a count of outstanding completions of said I/O requests from said host mapped to said asserted divert bit.

8. The storage control system of claim 7, wherein said counter is configured to increment said counter by one for each newly initiated I/O.

9. The storage control system of claim 7, wherein said counter is configured to decrement said counter by one for each I/O completion.

10. The storage control system of claim 7, wherein said storage system issues a completion confirmation message to said firmware when said counter reaches zero.

11. The storage control system of claim 10, wherein upon receipt of said completion confirmation message, firmware synchronizes RAID operations of said storage controller.

12. The storage control system of claim 7, where the storage controller is further configured to maintain one or more bitmaps of I/Os requests for processing by said firmware running on the said storage controller.

13. The storage controller system of claim 7, wherein the storage controller is further configured to transmit said I/Os processed by firmware from firmware to a storage device.

14. A non-transitory computer readable medium having instructions stored thereon for operating a storage control system that, when executed by a computer, at least instructs the computer to:
    initiate by storage controller firmware, a condition that requires synchronization of RAID operations of said storage controller with one or more affected I/Os;
    assert by storage controller firmware, a divert bit of said storage controller corresponding to affected virtual drive address ranges;
    receive, by the storage controller driver, a first I/O transaction request;
    process said I/O request based on attributes associated with said I/O request, wherein said I/Os with a condition that requires processing are diverted to firmware running on said storage controller, as indicated an asserted divert bit that the I/O maps to; and
        wherein I/Os without a condition that that does not collide with an asserted divert bit are transmitted to a storage device; and maintain a count, by means of a counter, of outstanding completions of said I/O requests from said host mapped to said asserted divert bit.

15. The medium of claim 14, wherein said counter is incremented by one for each newly initiated I/O.

16. The medium of claim 14, wherein said counter is decremented by one for each completed I/O.

17. The medium of claim 14, wherein said storage system issues a completion confirmation message to said firmware when said counter reaches zero.

18. The medium of claim 17, wherein, firmware synchronizes RAID operations of said storage controller upon receipt of said completion confirmation message.

19. The medium of claim 14, wherein the storage controller maintains a bitmap of I/Os for processing by said firmware running on the said storage controller.

20. The medium of claim 14, wherein the bitmap is stored in memory shared by the storage controller driver and the firmware running on the storage controller.

* * * * *